United States Patent [19]

Smith et al.

[11] Patent Number: 4,767,668

[45] Date of Patent: Aug. 30, 1988

[54] ELECTRIC WIRE AND CABLE

[75] Inventors: Timothy S. Smith, Trowbridge; David W. M. Thornley, Malmesbury, both of England

[73] Assignee: Raychem Limited, London, England

[21] Appl. No.: 887,160

[22] PCT Filed: Nov. 15, 1985

[86] PCT No.: PCT/GB85/00517

§ 371 Date: Jul. 10, 1986

§ 102(e) Date: Jul. 10, 1986

[87] PCT Pub. No.: WO86/03049

PCT Pub. Date: May 22, 1986

[30] Foreign Application Priority Data

Nov. 16, 1984 [GB] United Kingdom ............... 8428982

[51] Int. Cl.$^4$ .................... B32B 27/06; B32B 27/36
[52] U.S. Cl. .................... 428/379; 428/375; 525/444
[58] Field of Search ............. 525/444; 428/375, 379

[56] References Cited

U.S. PATENT DOCUMENTS

| 3,907,926 | 9/1975 | Brown et al. ............. 525/444 |
| 4,013,613 | 3/1977 | Abolins et al. ............ 524/513 |
| 4,097,446 | 6/1978 | Abolins et al. ............ 524/127 |
| 4,125,571 | 11/1978 | Scott et al. ............. 524/449 |
| 4,140,670 | 2/1979 | Charles et al. ............ 524/449 |
| 4,219,628 | 8/1980 | Weemes et al. ............ 525/166 |
| 4,327,198 | 4/1982 | Weemes et al. ............ 525/63 |
| 4,332,855 | 6/1982 | Zingheim ............. 428/379 |
| 4,369,282 | 1/1983 | Campbell ............. 525/445 |
| 4,467,057 | 8/1984 | Dieck et al. ............ 523/212 |

FOREIGN PATENT DOCUMENTS

| 852566 | 4/1977 | Belgium . |
| 2915155 | 11/1979 | Fed. Rep. of Germany . |
| 2255346 | 7/1975 | France . |

Primary Examiner—Patricia Short
Attorney, Agent, or Firm—Herbert G. Burkard; Edith A. Rice

[57] ABSTRACT

Electrical wire and cable is provided with a layer of insulation or jacketing material which comprises a mixture of: (1) a polyester based on tetramethylene terephthalate, preferably polytetramethylene terephthalate; and (2) more than 40%, based on polymer (1), of a block copolymer preferably having polytetramethylene terephthalate hard blocks and poly(polytetramethylene oxide terephthalate) soft blocks. Polymer (2) has a flex modulus of at least 69 MPa preferably at least 138 MPa. The insulation or jacketing material exhibits improved resistance to stress crazing in a number of solvents.

10 Claims, No Drawings

ELECTRIC WIRE AND CABLE

This invention relates to electrical wire and cable having insulation or jacketing materials based on polytetramethylene terephthalate (PTMT) polymers.

PTMT polymers are well known and have many useful properties. However, their tendency to embrittle at elevated temperatures, especially in presence of flame retardants, and their susceptibility to solvent stress crazing renders them unsuitable for a number of applications, e.g. as wire insulation.

British Pat. No. 1,603,910 discloses that the susceptibility of PTMT polymers to embrittlement in the presence of flame retardants is greatly reduced by blending the PTMT polymer with certain additional polymers which have solubility parameters within ±1.5 of the solubility parameter of the PTMT polymer. Examples of polymers that may be blended with the PTMT polymer are block copolymers having crystallizable hard blocks having repeating units of the general formula

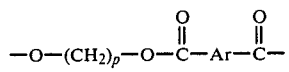

in which p is at least 2 and is preferably 4, and in which Ar represents an unsubstituted or substituted aryl group, and having amorphous soft blocks having repeating units of the general formula

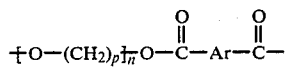

in which p and Ar are preferably as defined above and n has a value sufficient to give the repeating unit a molecular weight of about 600 to 3000, e.g. n, which may vary throughout the polymer, preferably has a value of from 6 to 40. Preferred polymers are copolymers having poly(tetramethylene terephthalate) hard blocks and soft blocks based on poly(polytetramethylene oxide terephthalate). The addition of these block copolymers has also been found to improve the solvent resistance of the blends to a number of solvents, e.g. acetone and methyl ethyl ketone, the improvement in solvent resistance presumably being due to the presence of the soft blocks (since the hard blocks are the same as the PTMT polymer).

However, although compositions disclosed therein are suitable for applications in a number of environments, it is difficult using such compositions to form wire or cable insulation that is resistant to more agressive solvents such as trichloroethane or petrol.

According to the present invention, there is provided an electrical wire or cable having a layer of insulation or jacketing material which comprises an intimate mixture of:
(1) a polyester in which at least 70 mole % of the repeating units are tetramethylene terephthalate units; and
(2) from more than 40% to 100% by weight, based on the weight of the polyester (1), of a block copolymer in which one of the blocks comprises repeating units of the general formula:

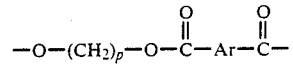

in which p is an integer of at least 2 and Ar represents an unsubstituted or substituted aryl group, and the other of the blocks comprises a polyalkylene ether; the block copolymer having a flex modulus of at least 69 MPa (10,000 p.s.i.) preferably at least 138 MPa (20,000 p.s.i.)

The flex modulus values referred to herein are measured by the method of ASTM 6790-71.

The present invention is based on our observation that, for a given ratio of block copolymer (2) to polyester (1), the resistance of the blend to solvent stress crazing increases with the hardness of the block copolymer (2), i.e. increases with the proportion of tetramethylene terephthalate hard blocks in the block copolymer (2). This is particularly surprising in view of the fact that it is only the presence of the soft blocks that distinguishes the block copolymer (2) from the polyester (1). Also, it has been observed that if the insulation or jacketing material contains less than 40% by weight of the block copolymer (2) based on the weight of the copolymer (1), the susceptibility of the insulation or jacketing material to solvent stress crazing becomes highly sensitive to relatively small changes in the extrusion conditions, with the result that the possibility of unacceptable solvent resistance is increased when the wire or cable is manufactured.

In the polyester (1), at least 70 mole %, preferably at least 80 mole %, particularly at least 90 mole %, especially 100 mole %, of the repeating units are tetramethylene terephthalate units.

Preferred copolymers (2) are those described above, and especially those having polytetramethylene terephthalate hard blocks and poly(polytetramethylene oxide terephthalate) soft blocks, which have a flex modulus of at least 172 MPa (25,000 p.s.i.) but preferably not more than 689 MPa (100,000 p.s.i.) more preferably not more than about 480 MPa (70,000 p.s.i.) and especially not more than about 345 (50,000 p.s.i.). These polymers generally comprise at least 83% hard block, especially at least 85% hard block by mole, but usually not more than 95% most usually not more than 90% hard block by mole, the remainder being soft blocks. It is possible, although not preferred, to form the insulation or jacketing material from a number of block copolymers of the general formula given above for polymer (2), in which case one or more of the block copolymers may have a flex modulus below the limit quoted provided that the flex modulus of the composite block copolymer (2) has the required flex modulus. The block copolymers (2) usually all have a solubility parameter that is within ±1.5 and most usually within ±1 (cal cm$^{-3}$)$^{\frac{1}{2}}$ of the solubility parameter of the polyester (1). The Solubility Parameters referred to herein are measured by the procedure described in polymer Handbook, edited by Brandrup and Immergut, 2nd Edition, Pages IV 337 to 339. The amount of polymer (2) preferably employed will depend on the balance needed, for the particular end use in view, between physical properties which are influenced by the presence of polymer (2). We have found that quantities greater than 40%, e.g. from 41 to about 49% and especially from 42 to 48% exhibit excellent toughness and scrape abrasion resistance combined with very high solvent crazing resistance while quantities greater than 50%, preferably from 51 to 60% e.g. about 55% exhibit yet better solvent resistance at the expense of toughness and insulation resistance, although for some applications quantities of up to 80% or even 100% are desirable.

In addition to improved stress crazing resistance, wire insulation used in the present invention exhibits very little "necking" when the wire is flexed around a small radius.

Polymers (1) and (2) are preferably the only organic polymers in the composition. If other organic polymers are present, the amount thereof is preferably less than 20%, based on the combined weights of polymers (1) and (2).

The reduction in embrittlement at elevated temperatures achieved by presence of polymer (2) is particularly marked when the composition contains a flame retardant, especially a halogen-containing organic flame retardant. Halogen-containing flame retardants are well known, and include for example decabromodiphenyl ether or ethylene-bis-tetrabromophthalimide, as well as other aromatic and aliphatic compounds. The amount of bromine-containing present will generally be at least 3%, preferably at least 5%, e.g. 5–30% or 5–25%, by weight of the composition. The bromine-containing flame retardants are frequently used in conjunction with inorganic flame retardants, for example antimony trioxide, which are known to demonstrate a synergistic effect with halogen-containing organic flame retardants. Thus preferred compositions contain 3 to 15% by weight of antimony trioxide. The ratio by weight of polymer (2) to total flame retardant is preferably at leat 1:1.

The insulation and jacketing materials used in the present invention preferably contain at least one antioxidant. Suitable anitoxidants include the hindered phenols which are well known in the art, present for example in amount from 0.25 to 5% by weight of the composition.

The materials can also contain conventional additives such as fillers, processing aids and stabilisers, generally in total amount not more than 10% by weight.

The insulation or jacketing materials may be used in their uncrosslinked form or may be crosslinked. They may be crosslinked by means of chemical cross-linking agents or by irradiation, for example by expo-sure to high energy irradiation such as an electron beam of $\gamma$ rays. Radiation dosages in the range 2 to 80 Mrads, preferably 5 to 50 Mrads, e.g. 10 to 30 Mrads are in general appropriate.

For the purpose of promoting cross-linking during irradiation preferably from 0.2 to 5 weight percent of a prorad such as a poly-functional vinyl or allyl compound, for example, triallyl cyanurate, triallyl isocyanurate or pentaerythritol tetramethacrylate are incorporated into the composition prior to irradiation.

The degree of cross-linking of the compositions may be expressed in terms of the gel content (ANSI/ASTM D2765-68) of the cross-linked polymeric composition, i.e. excluding non-polymeric additives that may be present. Preferably the gel content of the cross-linked composition is at least 10% more preferably at least 20%, e.g. at least 30%, more preferably at least 40%.

The materials are preferably used according to the invention as wire insulation, and especially as primary insulation for equipment wire although it is possible for other materials to be used as well, e.g. in dual-wall insulation, in which case the materials may be used as a primary insulation or a primary jacket or both. Generally the wire size is 4 AWG to 38 AWG, preferably 10 to 30 AWG, and the coating has a thickness of 0.05 to 0.76 mm (0.002 to 0.030 inch) preferably 0.1 to 0.35 mm (0.004 to 0.150 inch).

The invention is illustrated in the following Examples in which parts and percentages are by weight unless otherwise specified.

EXAMPLE 1

The following ingredients were thoroughly mixed in a twin-screw compounder:

|  |  | Parts by Weight |
|---|---|---|
| Polymer (1) | polytetramethylene terephthalate solubility parameter = 9.5 (cal cm$^{-1}$)$^{\frac{1}{2}}$ density - 1.31 | 100 |
| Polymer (2) | Block copolymer comprising 87% by mole polytetramethylene terephthalate (hard blocks) and 13% by mole poly(polytetramethylene ether) terephthalate (soft blocks) having a flex modulus of about 208 MPa (30,000 p.s.i.) | 50 |

The pelletised or chowdered mixture was extruded on a laboratory extruder with a head temperature of about 260° C. into a 20 AWG stranded copper conductor to form an insulated wire having an insulation wall thickness of about 0.125 mm. Five wires were extruded under a variety of conditions that simulate various conditions encountered in production extrusion: the extruded wires were run into hot water (70° C.), cold water or simply into air, and the water bath-die separation varied up to 1 m. In some instances the conductor was preheated to 90° C. while in others the conductor was cold. A sample of each wire was immersed in a solvent for 40 hours and then visually examined for solvent stress crazing, the presence of which was recorded as a failure and the absence of which was recorded as a pass. The results are shown in Table I.

EXAMPLE 2

(Comparison)

Example 1 was repeated with the exception that the polymer blend from which the insulation was formed contained only 33 parts of polymer (2) per 100 parts of polymer (1). The results are also shown in Table I from which it can be seen that the resulting wire insulation is considerably more susceptible to solvent stress crazing than that of Example 1.

EXAMPLE 3

Example 1 was repeated with the exception that the polymer blend from which the insulation was formed contained 45 parts of polymer (2) per 100 parts of polymer (1) and that two wire wires were formed by extrusion runs in which the wire was run either into air or into hot water, and without preheating of the conductor. the results are also shown in Table I.

EXAMPLE 4

Example 3 was repeated with the exception that the polymer blend from which the insulation was formed contained 70 parts of polymer (2) per 100 parts of polymer (1). The results are shown in Table I.

EXAMPLE 5

(Comparison)

100 parts by weight of polytetramethylene terephthalate were blended with 33 parts by weight of a block copolymer comprising about 80% by mole polytetramethylene terephthalate (hard blocks) and 20% by mole poly(polytetramethylene ether terephthalate) (soft blends) having a flex modulus of about 48 MPa (7000 p.s.i.). The pelletised mixture was extruded on a laboratory extruder with a head temperature of about 260° C. onto a preheated 20 AWG stranded copper conductor to form an insulated wire having an insulation wall thickness of about 0.125 mm. The wire was passed into a 70° C. water bath about 15 cm from the die head. The wire was tested for solvent stress crazing as described in Example 1 and the results are shown in Table I. It ca be seen that this sample had significantly poorer solvent resistance than those of Example 1 even though the proportion of soft blocks in the overall blend was higher than in the blend of Example 1.

EXAMPLE 6 AND EXAMPLE 7

(Comparison)

The following ingredients were thoroughly mixed in a twin-screw compounder:

|  | Example 6 | Example 7 |
|---|---|---|
|  | Parts by Weight | |
| PTMT Polymer (1) (as Example 1) | 100 | 100 |
| Polymer (2) (as Example 1) | 52 | 33 |
| antioxidant (Tetrakis (methylene 3-(3',5'-di tert-butyl-4' hydroxyphenyl) propionate) | 3.7 | 0.8 |
| flame retardant | | |
| (a) ethylene-bis-tetrabromophthalimide | 14.8 | — |
| (b) decabromo-diphenyl ether | — | 21.7 |
| (c) antimony trioxide | 14.8 | 10.8 |

The blends were each extruded onto a 20 AWG copper conductor (without preheating the conductor) as described in Example 5 and the wires were tested for solvent stress crazing as described in Example 1. The results are shown in Table I.

TABLE I

| Example | SOLVENT | | | | |
|---|---|---|---|---|---|
|  | Trichloroethane | Diesel Fuel | Petrol | A.V.T.A.G.* | Ethylene Glycol |
| 1 | 5 passed | 5 passed | 5 passed | 5 passed | 5 passed |
|  | 0 failed | 0 failed | 0 failed | 0 failed | 0 failed |
| 2 | 1 passed | 3 passed | 2 passed | 3 passed | 3 passed |
| (comparison) | 4 failed | 2 failed | 3 failed | 2 failed | 2 failed |
| 3 | 2 passed | 2 passed | 2 passed | 2 passed | 2 passed |
|  | 0 failed | 0 failed | 0 failed | 0 failed | 0 failed |
| 4 | 2 passed | 2 passed | 2 passed | 1 passed | 2 passed |
|  | 0 failed | 0 failed | 0 failed | 1 failed | 0 failed |
| 5 | failed | failed | — | — | failed |
| (comparison) | | | | | |
| 6 | passed | passed | passed | passed | passed |
| 7 | failed | failed | failed | failed | passed |
| (comparison) | | | | | |

*Aviation fuel - See Def. Stan 01-5/1 (Feb. 1976)

We claim:

1. An article of manufacture comprising an electrical wire or cable having a layer of insulating or jacketing material which comprises an intimate mixture of:
   (1) a polyester in which at least 70 mole % of the repeating units are tetramethylene terephthalate units; and
   (2) from more than 40% to 100% by weight, based on the weight of the polyester (1), of a block copolymer in which one of the blocks is composed of repeating units which have the formula

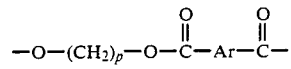

in which p is an integer of at least 2 and Ar represents an unsubstituted or substituted aryl group, and the other of the blocks comprises a polyalkylene ether; the block copolymer having a flex modulus of at least 172 MPa.

2. An article as claimed in claim 1, wherein the insulating or jacketing material comprises more than 50% of polymer (2) based on the weight of polymer (1).

3. An article as claimed in claim 1, wherein polymer (1) is polytetramethylene terephthalate.

4. An article as claimed in claim 1, wherein polymer (2) has a flex modulus of less than 689 MPa.

5. An article as claimed in claim 1, wherein polymer (2) comprises a segmented polyether ester copolymer in which one of the blocks is composed of units of the formula

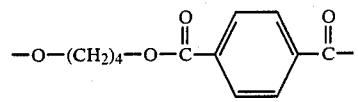

and the other of the blocks is composed of units of the general formula

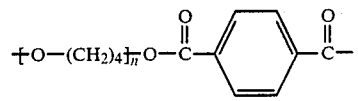

in which n is an integer of from 6 to 40.

6. An article as claimed in claim 1, wherein the insulating or jacketing material includes a flame retardant.

7. An article as claimed in claim 6, wherein the flame retardant is present in an amount of at least 50% of the weight of polymer (2).

8. An article as claimed in claim 6, wherein the flame retardant is present in an amount in the range of from 5 to 30% by weight based on the weight of the mixture.

9. An article as claimed in claim 6, wherein the flame retardant comprises a bromine containing organic flame retardant.

10. An article as claimed in claim 6, wherein the insulating or jacketing material includes antimony trioxide.

* * * * *